United States Patent [19]

Koide et al.

[11] 4,397,878

[45] Aug. 9, 1983

[54] PROCESS FOR PRODUCING A CREAM CHEESE-LIKE FOOD

[75] Inventors: Kaoru Koide; Yoshiki Yoneda; Kenkichi Musashi, all of Higashimurayama, Japan

[73] Assignee: Meiji Milk Products Company Limited, Tokyo, Japan

[21] Appl. No.: 270,656

[22] Filed: Jun. 4, 1981

[30] Foreign Application Priority Data

Jul. 15, 1980 [JP] Japan .................................. 55-095708

[51] Int. Cl.$^3$ .......................... A23C 19/12; A23C 9/12
[52] U.S. Cl. ...................................... 426/40; 426/582; 426/585; 426/409
[58] Field of Search .................. 426/38, 40, 104, 585, 426/602, 613, 582, 409

[56] References Cited

U.S. PATENT DOCUMENTS

| | | | |
|---|---|---|---|
| 1,879,162 | 9/1932 | Frederiksen | 426/38 |
| 3,397,994 | 8/1968 | Elenbogen et al. | 426/602 |
| 4,000,332 | 12/1976 | Strinning et al. | 426/585 |
| 4,197,322 | 4/1980 | Middleton | 426/40 |
| 4,232,050 | 11/1980 | Rule et al. | 426/582 |

*Primary Examiner*—Raymond N. Jones
*Assistant Examiner*—Elizabeth J. Curtin
*Attorney, Agent, or Firm*—Browdy & Neimark

[57] ABSTRACT

A process for producing a cream cheese-like food comprising casein, an oil or fat, an emulsifying agent, lactose, a calcium salt in an amount of 4-24 mg, preferably 6-15 mg (as calcium) per gram of casein, and an orthophosphate wherein these ingredients are mixed together to obtain a solution. The resulting mixture solution is pasteurized, homogenized and cooled to 20°-32° C. to obtain an emulsion, then a starter and rennet are added to the emulsion. The whole emulsion mixture is fermented at 20°-32° C., the fermentation process is suspended in the pH range of 5.4-5.9, then glucono δ-lactone, a stabilizer and necessary additives are added thereto. The resultant whole mixture is pasteurized, charged into containers and then cooled. This method can be practiced to continuously make a cream cheese-like food by using a stirring device, homogenizer, transportation line, etc., which equipment is generally used in the dairy industries.

10 Claims, 1 Drawing Figure

PROCESS FOR PRODUCING A CREAM CHEESE-LIKE FOOD

FIELD OF THE INVENTION

The present invention relates to a process for producing a cream cheese-like food by an industrial, continuous operation.

BACKGROUND OF THE INVENTION

More particularly, the present invention relates to a process for the mass production of a cream cheese-like food, in a manner advantageous for factory production, by fermenting a thick emulsion having substantially the same composition as that of cream cheese or Neufchâtel cheese and also having a high solid content and a high fat content while the viscosity increase in the fermentation step is controlled and fluidity is maintained over the whole process.

Generally, the cream cheese is produced by pasteurizing and homogenizing a fresh cream of a high quality, adding a starter and rennet thereto to effect the fermentation, filtering the thus formed curd by means of a cloth bag or centrifugal separator to remove the whey, then adding common salt and a stabilizer thereto and subjecting the resulting product to the pasteurization, homogenization, charging in to containers and cooling processes to obtain the final product. The cream cheese is expensive, since fresh cream of a high quality is used as the starting material. In addition, the industrial mass production thereof is disadvantageously characterized by the quite complicated steps such as the fermentation step in which the curd is formed, and the step of removing the whey therefrom. This further elevates the cost of cream cheese.

However, the cream cheese suitably matches our recent eating habits and the uses thereof are now increasing over a broad range. For example, it is used domestically or in the confectionary industry as an ingredient in baking cakes and as a garnish for snacks such as biscuits. Under the circumstances set forth above, the development of an economically advantageous cream cheese-like food has been demanded.

There has been proposed a process for producing a product like cream cheese or Neufchâtel cheese from inexpensive milk protein and fat. In the specification of Japanese Patent Publication No. 27948/1972, there is disclosed a process for producing a lactic spread by fermenting milk protein and fat with lactic acid-producing thermobacteria until pH 4.8–5.4 is attained, then pasteurizing and cooling the fermentation product and working the same until a cohesive, plastic mass is obtained without separation of the whey.

However, according to this process, it is difficult to obtain the fermentative flavor peculiar to the cream cheese, since the fermentation is effected at temperatures as high as 40°–44° C. in the presence of the lactic acid-producing thermobacteria (*Lactobacillus bulgaricus* and *Streptococcus thermophilus*).

In this process, no special care is taken for the reduction of viscosity of the thick emulsion, since the fermentation temperature is higher than the melting point of the fat. The product thus obtained is a non-fluid semi-solid, since the fermentation is continued until pH 4.8–5.4 is attained. Further, the steps are effected discontinuously because kneading for a long period of time is required. Kneading at temperatures below 55° C. incurs the risk of bacterial contamination.

OBJECTS AND SUMMARY OF THE INVENTION

For the purpose of developing a process for the mass production of an inexpensive cream cheese-like food having a texture and flavor very close to those of cream cheese, applicants have made investigations into the continuous production of a cream cheese-like food. In this process, lactic acid bacteria ordinarily used for the production of cream cheese such as *Streptococus lactis* and *Streptococcus cremoris* are used and the fermentation is effected at an optimum fermentation temperature of those bacteria in the range of 20°–32° C. The liquid fluidity is maintained throughout the steps of emulsion-production, low temperature fermentation, and subsequent pasteurization. A stirring device, homogenizer, transportation line, etc., which are generally used in the dairy industries for the production of liquid milk, cream and cheese, are combined together and used in this process.

Figure 1:
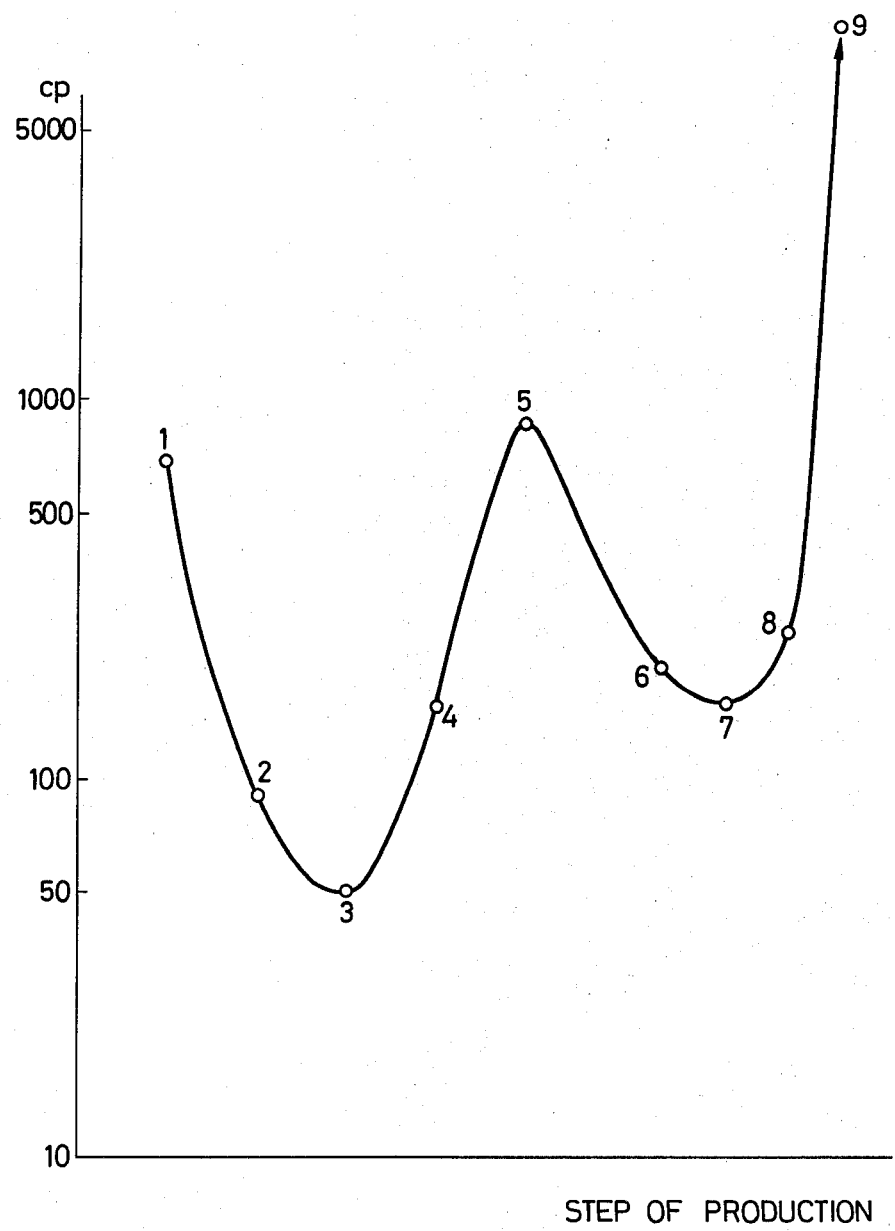
FIG. 1 shows the results of the measurement of viscosity changes in the steps of the production of a cream cheese-like food according to the present invention, as follows.

1 ... When aqueous phase and oily phase are mixed together,
2 ... After the addition of calcium and phosphorus,
3 ... After the pasteurization but before the homogenization,
4 ... Immediately after the homogenization,
5 ... When cooled to 20° C. (pH 6.6)
6 ... When pH 5.6 was attained in the fermentation,
7 ... When pH 5.5 was attained in the fermentation,
8 ... When pH 5.4 was attained in the fermentation,
9 ... When pH 5.3 was attained in the fermentation.

DETAILED DESCRIPTION OF PREFERRED EMBODIMENTS

The present invention provides a process for producing a cream cheese-like food characterized in that casein, an oil or fat, an emulsifying agent, lactose, a calcium salt, and an orthophosphate are dissolved in water; the resulting mixture solution is pasteurized and homogenized to obtain an emulsion; then a starter and rennet are added to the emulsion, the whole is fermented at 20°–32° C., the fermentation is suspended in the pH range of 5.4–5.9, then glucono δ-lactone, a stabilizer and necessary additives are added thereto and the whole is pasteurized, charged into containers and cooled.

During the production operation, the steps, in which the fluidity is reduced and thus problems in continuous production are apt to occur, consist of the step of cooling the homogenized emulsion to 31°–20° C. and the fermentation step.

Factors affecting the viscosity change during the operation were discussed. It has been found that it is greatly effective to add a calcium salt, in an amount in a limited range per unit casein, thereby partially converting hydrated casein into calcium caseinate for obtaining a low viscosity at pH 5.4–5.9 in the fermentation step of an emulsion containing no non-fat milk solid but including hydrated casein as the principal protein.

One of the characteristic features of the present invention is that a calcium salt in an amount of 3–24 mg, preferably 6–15 mg (calculated as calcium), per gram of casein is added to the previously formed emulsion prior to the homogenization. By this treatment, the low viscosity, i.e. fluidity, can be maintained even if the temperature of the emulsion is lowered to 20° C. or even if pH is lowered during the leaving-to-stand fermentation for a long period of time. However, when the fermentation proceeds to lower the pH to 4.8–5.1, which is an ordinary pH value of cream cheese, the emulsion is rapidly thickened and solidified. If the emulsion becomes solidified, continuation of the producing operation becomes impossible and partial demulsification is apt to occur in the solidified curd.

Another characteristic feature of the present invention is that a starter and rennet are added to the emulsified mixture and fermentation is effected at 20°–32° C., the fermentation process being suspended at a pH in the range of 5.4–5.9. If the fermentation is effected in the presence of the starter and rennet, viscosity of the emulsion, as shown in the examples, set forth below is gradually reduced. For example, if the emulsion has a viscosity of about 700 cp in the initial stage of the fermentation, the viscosity is gradually reduced to reach the lowest value of 150 cp at pH 5.5–5.6. Then, the viscosity is rapidly increased. At pH 5.3, the viscosity is at least 10,000 cp. Those viscosities are determined by means of a B-viscometer at 60 rpm. and represented by centipoise units of measurement.

In the present invention, the fermentation process is suspended in the pH range of 5.4–5.9, preferably 5.5–5.8 and, therefore, the viscosity is up to about 150–220 cp in this case. The fermentation product can be transferred into a pasteurization device directly from the fermentation device by means of a pipe. Viscosities of the cream cheese-like food, produced according to the present invention, vary in the respective steps, for example, as shown in FIG. 1. It is apparent from FIG. 1 that the viscosity is about 700 cp (1) when the aqueous phase and the oily phase are mixed together, then reduced to less than 100 cp (2) by the addition of necessary amounts of a calcium salt and a phosphoric acid salt and finally reduced to about 50 cp (3) after completion of the pasteurization. After the homogenization by means of a valve homogenizer, an emulsion having a viscosity of about 150–250 cp (4) is obtained. The emulsion is cooled by means of a plate heat exchanger or a jacket stirring tank, whereby the viscosity is increased. The emulsion having the composition shown in the examples given below maintains its liquid form of a sufficient fluidity in the range of 550–900 cp (5) even at 20° C. A starter and rennet are added thereto and the whole is incubated at 20° C. Until a pH 5.6–5.5 (6) (7) has been attained, the viscosity is reduced to about 150 cp as the pH is lowered. At a pH of above 5.4, it can be treated as a liquid of a low viscosity (8). (9) in the figure indicates a rapid viscosity increase which occurs when pH is further lowered.

Still another characteristic feature of the present invention is that glucono δ-lactone and a stabilizer such as guar gum, locust bean gum or starch is added to the thus obtained fluid fermentation product and the whole is pasteurized by heating, charged into containers, and cooled, whereby it coheres into a cheese-like curd. Glucono δ-lactone acts to lower the pH value of the fermentation product from 5.4–5.9 to 4.6–5.2. The stabilizer is added for the purpose of promoting the emulsification of the fat in the pasteurization to increase the water retention of the product, thereby providing a body like that of the cream cheese after cooling.

In the present invention, casein, an oil or fat, an emulsifying agent, lactose, a calcium salt, and an orthophosphate as principal components are dissolved in water to obtain an emulsified mixture. Casein used as the main starting material is selected from the group consisting of lactic casein, sodium caseinate, calcium caseinate, etc. to which a small amount of skim milk powder may be added as necessary. The amount of casein to be used is such that it is contained in the final product in an amount of about 4–15%, preferably about 6–10%. For the oil or fat, butter, butter oil, a vegetable oil or fat, or an animal oil or fat either alone or in the form of a mixture thereof may be used. The amount of the oil or fat to be used is such that it is contained in the final product in an amount of about 15–40%, preferably about 20–35%. The emulsifying agent is suitably selected from the group consisting of monoglycerides, lecithin, and sorbitan/fatty acid esters. They may be used either alone or in the form of a mixture of two or more of them in such an amount that the emulsifying agent is contained in the final product in an amount of about 0.01–0.6%.

Lactose is used in such an amount that it is contained in the final product in an amount of about 0.5–4.0%, preferably about 1.0–2.5%.

The calcium salt is selected from the group consisting of calcium salts such as calcium chloride and calcium hydroxide. The calcium salt is used in such an amount that 3–24 mg, preferably 6–15 mg of calcium is contained per gram of casein in the final product.

If the amount of calcium is insufficient, the partial casein micell formation due to the formation of calcium caseinate is also insufficient, whereby the emulsion has a high viscosity, fat-globules are apt to cohere to cause the fat to float in the course of the fermentation and the viscosity becomes extremely high at a pH above 5.4, thereby causing problems.

If the amount of calcium is excessive, the resulting product is bitter and casein becomes unstable to form precipitates unfavorably. The orthophosphate is selected from the group consisting of sodium dihydrogenphosphate, potassium dihydrogenphosphate, disodium hydrogenphosphate, dipotassium hydrogenphosphate, etc. The orthophosphate is used in such an amount that about 1.4–28.0 mg, preferably 2.7–14 mg of phosphorus per gram of casein is contained in the product. If the amount of the orthophosphate is insufficient, the gloss on the surface of the product is lost, the texture becomes insufficiently smooth and, in addition, a rapid pH lowering sometimes occurs in the fermentation step due to the insufficient buffer action, whereby the texture becomes too solid. On the contrary, if the amount of the orthophosphate is excessive, the crispness of the texture becomes poor and an excessively long period of time is required for obtaining a given pH value due to an excess buffer action in the fermentation procedure.

Since lactose, calcium and phosphate are contained in considerable amounts in skim milk powder, about 0–47 g of the skim milk may be used per kilogram of the product to replace a part thereof with the skim milk powder.

In the present invention, casein, lactose, an oil or fat, an emulsifying agent, water, a calcium salt, an orthophosphate, etc. are mixed together and then previously emulsified. The resulting emulsion is pasteurized homogenized and cooled to 20°–32° C. to obtain an emulsion. To the emulsion are added a starter and rennet to ferment at 20°–32° C. The starter is selected from the group consisting of lactic acid bacteria such as *Streptococcus lactis, Streptococcus cremoris, Streptococcus diacetilactis* and *Leuconostoc citrovorum*. One or more starters selected from the above group are incubated in, for example, 10% skim milk powder solution for about 16–20 hours and the culture solution is used directly. The starter is used in an amount of about 0.8–5% based on the emulsion. In case rennet is used in the form of 60,000 unit powder, the amount thereof is about 0.1–5.0 mg per kilogram of the final product.

The fermentation process is carried out at 20°–32° C. and is suspended when pH of the emulsion becomes 5.4–5.9, preferably 5.5–5.8. The emulsion is transported from the fermentation tank into a pasteurization mixing tank through a pipe. Glucono δ-lactone, a stabilizer and necessary additives are added thereto and the whole is pasteurized at about 80° C., charged into containers and cooled to obtain a dairy product having a flavor and body very close to those of cream cheese. Glucono δ-lactone is capable of lowering pH of the emulsion, which has been kept at 5.4–5.9 during the fermentation, to 4.7–5.2 which is a pH value of cream cheese. The stabilizer is selected from the group consisting of locust bean gum, guar gum, carboxymethyl cellulose, crystalline cellulose and starch. The stabilizer is used for increasing viscosity of the emulsion in the cooling step to obtain a texture very close to the texture of cream cheese. The other additives include seasonings such as common salt, thick malt syrup and flavors.

The following examples further illustrate the present invention.

EXAMPLE 1

An aqueous phase obtained by hydrating and dissolving 10.03 Kg of sodium caseinate and 1.63 Kg of lactose in 62 Kg of water was mixed at 70° C. with an oily phase obtained by dissolving 125 g of lecithin, 250 g of a monoglyceride, 63 g of a sorbitan/fatty acid ester and 1 g of β-carotene in 42.01 Kg of a vegetable oil mixture (comprising 70% slightly hydrogenated rape oil and 30% coconut oil) molten by heating.

To the liquid mixture were added 46.4 g of calcium hydroxide powder, a solution of 368.7 g of calcium chloride dihydrate in 1.95 Kg of water, and a solution of 22 g of disodium hydrogenphosphate dodecahydrate and 60.2 g of potassium dihydrogenphosphate in 1.25 Kg of water in this order. The whole was pasteurized, homogenized and cooled to 20° C. to obtain an emulsion.

To the emulsion were added 1.25 Kg of *Str. lactis* starter which was incubated in 10% skim milk powder solution as medium, and rennet solution (62.5 mg as powder) and the whole was fermented at 20°–21° C. overnight (16–20 hours) to obtain a liquid acidic emulsion of pH 5.6. The emulsion was mixed with 750 g of glucono δ-lactone, 880 g of common salt, 188 g of carboxymethyl cellulose, 250 g of locust bean gum and 1.9 Kg of powdered thick malt syrup. The mixture was pasteurized by means of a cheese kneader at 87° C., charged into containers and cooled to obtain a food having a flavor and a body very close to those of cream cheese.

The product contained about 53.5% of water, 33.5% of fat and 7.6% of protein.

EXAMPLE 2

An aqueous phase obtained by hydrating and dissolving 9.28 Kg of sodium caseinate and 3.39 Kg of skim milk powder in 54.8 Kg of water was mixed at 60°–70° C. with an oily phase obtained by dissolving 125 g of lecithin, 250 g of a monoglyceride and 1 g of β-carotene in a mixture of 205 Kg of a vegetable oil or fat and 130 Kg of butter oil molten by heating. To the liquid mixture were added 37.1 g of calcium hydroxide powder, a solution of 147.5 g of calcium chloride dihydrate in 1.25 Kg of water and a solution of 314 g of disodium hydrogenphosphate and dodecahydrate and 188 g of potassium dihydrogenphosphate in 2.51 Kg of water in this order. The whole was sterilized, homogenized and cooled to 31° C. to obtain an emulsion.

To the emulsion were added 5.52 Kg of *Str. lactis* starter which was incubated in 10% skim milk powder solution as medium, and a rennet solution (125 mg as powder) and the whole was fermented at 31° C. for 5 hours to obtain a liquid acidic emulsion of pH 5.6–5.7. The emulsion was mixed with 880 g of glucono δ-lactone, 880 g of common salt, 180 g of microcrystalline cellulose, 300 g of guar gum and 3.15 Kg of powdered thick malt syrup. The mixture was pasteurized by means of a stirrer provided with a jacket which had large stirring blades in upper and lower portions, then charged into containers and cooled to obtain a food having a flavor and a body very close to those of cream cheese.

What is claimed is:

1. A process for producing a cream cheese-like food comprising:
   mixing casein, an oil or fat, an emulsifying agent, lactose, calcium salt in an amount of 4–24 mg of calcium ion per gram of casein, water and an orthophosphate to obtain a liquid mixture,
   pasteurizing the resulting liquid mixture,
   homogenizing the pasteurized liquid mixture,
   cooling the homogenized liquid mixture to 20°–32° C. to obtain a liquid emulsion of an oil-in-water,
   adding a starter and rennet to the emulsion,
   fermenting the emulsion at 20°–32° C. until the pH of the mixture reaches 5.4–5.9,
   pasteurizing the fermented mixture in the pH range of 5.4–5.9,
   adding a stabilizer and glucono δ-lactone to the fermented mixture,
   pasteurizing the mixture, and
   charging the pasteurized mixture into containers.

2. A process as in claim 1 wherein the calcium salt is added in an amount of 6–15 mg of calcium ion per gram of casein.

3. A process as in claim 1 wherein the orthophosphate is added in an amount of 1.4–28.0 mg of phosphorus per gram of casein.

4. A process as in claim 3 wherein the casein added is selected from the group consisting of lactic casein, sodium caseinate and calcium caseinate.

5. A process as in claim 4 wherein the oil or fat added is selected from the group consisting of butter, butter oil, vegetable oil or fat and animal oil or fat, each alone or in admixture.

6. A process as in claim 5 wherein the emulsifying agent is selected from the group consisting of monoglycerides, lecithin and sorbitan fatty acid esters.

7. A process as in claim 6 wherein the orthophosphate is selected from the group consisting of sodium dihydrogen phosphate, potassium dihydrogen phosphate, disodium hydrogenphosphate and dipotassium hydrogen phosphate.

8. A process as in claim 7 wherein the stabilizer is selected from the group consisting of locust bean gum, guar gum, carboxymethyl cellulose, crystalline cellulose and starch.

9. A process as in claim 8 wherein the calcium salt is selected from the group consisting of calcium chloride and calcium hydroxide.

10. A process as in claim 9 wherein the additive is selected from the group consisting of common salt and thick malt syrup.

* * * * *